UNITED STATES PATENT OFFICE.

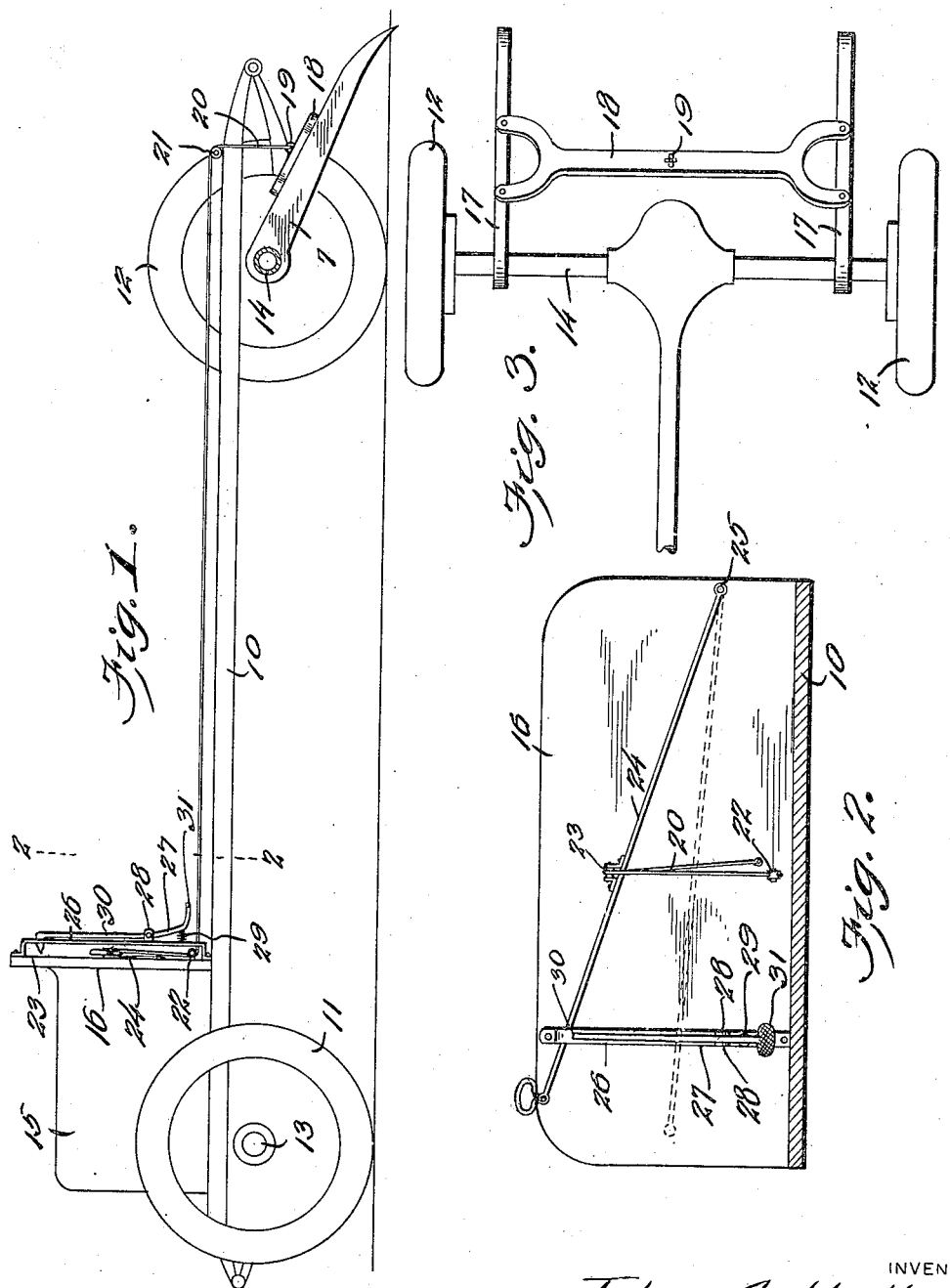

JOHN A. HALL, OF ARKADELPHIA, ALABAMA.

AUTOMOBILE-HOLDER.

1,262,484.   Specification of Letters Patent.   Patented Apr. 9, 1918.

Application filed August 7, 1917. Serial No. 184,957.

*To all whom it may concern:*

Be it known that I, JOHN A. HALL, a citizen of the United States, residing at Arkadelphia, in the county of Cullman and State of Alabama, have invented certain new and useful Improvements in Automobile-Holders, of which the following is a specification.

This invention relates to an improved automobile holder for use upon a steep hill and the principal object of the invention is to provide a holder which may be connected with the rear portion of the car and when in an operative position engage the ground to the rear of the car thus preventing the car from traveling backward down the hill.

Another object of the invention is to so construct this improved holder that it may be actuated from the driver's seat and may be easily lowered or raised when desired without it being necessary to leave the car.

Another object of the invention is to so construct this improved holder that it will obtain a firm grip upon the ground thus doing away with the danger of the car slipping and moving down a hill when the car is brought to a stop at some point upon the hill.

Another object of the invention is to so construct this improved stop that it may be left trailing upon the ground when traveling up a hill thus preventing danger of the car slipping down the hill in case the wheels should not obtain a firm grip upon the road-bed or in case the engine should stop while traveling up the hill.

Another object of the invention is to so construct this improved device that it will not take room upon the car used for other purposes and to further so construct it that it will not be in the way or unsightly.

This invention is illustrated in the accompanying drawings, wherein:—

Figure 1 is a view showing a portion of an automobile in elevation with the rear axle shown in section and the improved device shown in place.

Fig. 2 is a transverse sectional view taken along the line 2—2 of Fig. 1, and

Fig. 3 is a top plan view of the rear portion of Fig. 1.

This device is used in connection with an automobile indicated in general by the numeral 10 and provided with the front wheels 11 and rear wheels 12 mounted in the usual manner upon axles 13 and 14. In Fig. 1 there is also shown the engine casing 15 and dash-board 16 upon which will be mounted the actuating mechanism for this improved stop as shown in Fig. 2.

This improved stop or shock is provided with side bars or arms 17 constituting road engaging arms or elements and having their end portions sharpened as shown in Fig. 1 so that they can obtain a firm grip upon the road-bed and if necessary penetrate the road-bed. These side arms are connected by the cross bar 18 which cross bar is provided intermediate its length with an eye 19 by means of which the line or cable 20 may be connected with the cross bar. This line 20 passes over a pulley 21 secured at a suitable point upon the body of the automobile and is carried forwardly and passed about the pulleys 22 and 23 and connected with the dash-board 16. An actuating lever 24 which carries pulley 23 is pivotally mounted to the dash-board as shown at 25 and has its free end portion extending between the dash-board and the guiding bracket or yoke 26. This bracket 26 not only serves to guide the movement of this actuating lever but further serves to limit the swinging movement of the lever. The cable or line 20 is connected with this actuating lever at a point intermediate its length and it will be readily seen that when the lever is moved, the stop will be raised or lowered according to the movement given the lever. When the lever is drawn upwardly, a pull is exerted upon the line 20 and this will swing the stop upwardly out of engagement with the ground. When the lever is released and permitted to move downwardly the stop will of its own weight drop into engagement with the ground. In order to releasably hold this lever in a raised position with the stop raised, there has been provided a latching lever 27 pivotally mounted between the ears 28 of the bracket 26 and yieldably held in the position shown in Fig. 1 by the spring 29. The tooth or head 30 of this latch has its lower face sloping to provide a cam and its upper face cut straight so that when the lever 24 is swung upwardly, it may engage the cam face of the latch head and thus move the latch to permit the lever to move upwardly beyond the engaging head. The lever will then engage the straight cut face of this latch head and the lever will be held in the raised position. A pedal extension 31 is provided so that when it is desired to release the stop, the foot may be placed upon this extension and the latch thus swung to an inoperative position, to release the actuating lever and permit the stop to drop into engagement with the road-bed. It will thus be seen that when traveling up a hill, this stop may be quickly and easily released in case the engine should stop by simply placing the foot upon the extension 31 thereby preventing danger of the machine moving rearwardly down the hill.

I have therefore provided a stop which will be very efficient in operation and which will be very strong and durable since the ground engaging arms 17 are mounted upon the axle casing and are further so constructed that they will obtain a firm grip upon the road bed. I have further provided a device of the character described in which the actuating mechanism will be simple but efficient in operation and so mounted that it may be easily reached for releasing the stop or returning the stop to an inoperative position.

What is claimed is:—

1. The combination with a vehicle including a body having a dash-board and a rear axle, of a brake element loosely connected with the rear axle for engagement with the ground when in an operative position, an actuating lever pivotally connected with the dash-board, a guiding bracket guiding and limiting the swinging movement of the actuating lever, a latch connected with the guiding bracket for engaging the actuating lever and releasably holding the lever in an adjusted position, and means connecting the actuating lever with the brake element.

2. The combination with a vehicle including a body having a dash-board and a rear axle, of a brake device comprising a ground engaging element pivotally mounted upon the rear axle and extending for engagement with the ground when in an operative position, an actuating lever pivotally connected with the dash-board, a guiding bracket guiding and limiting the swinging movement of the actuating lever, a latch pivotally connected with the bracket and provided with an engaging head extending to engage the actuating lever and releasably hold the actuating lever in an adjusted position, and means connecting the actuating lever with the ground engaging element.

In testimony whereof I affix my signature in presence of two witnesses.

JOHN A. HALL.

Witnesses:
J. J. BAKER,
T. H. ARWOOD.